United States Patent
Igarashi et al.

(10) Patent No.: US 9,481,085 B2
(45) Date of Patent: Nov. 1, 2016

(54) HORIZONTAL ARTICULATED ROBOT

(71) Applicant: Seiko Epson Corporation, Tokyo (JP)

(72) Inventors: Katsuji Igarashi, Chino (JP);
Masatoshi Ono, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/317,049

(22) Filed: Jun. 27, 2014

(65) Prior Publication Data
US 2014/0316574 A1    Oct. 23, 2014

Related U.S. Application Data

(63) Continuation of application No. 13/399,084, filed on Feb. 17, 2012, now Pat. No. 8,798,795.

(30) Foreign Application Priority Data

Feb. 22, 2011    (JP) ................. 2011-035859

(51) Int. Cl.
*G05B 15/00*    (2006.01)
*G05B 19/00*    (2006.01)
*B25J 9/16*    (2006.01)

(52) U.S. Cl.
CPC ............. *B25J 9/1651* (2013.01); *B25J 9/1641* (2013.01); *B25J 9/1694* (2013.01)

(58) Field of Classification Search
CPC ........ B25J 9/042; B25J 9/023; B25J 9/1694; B25J 9/1651; B25J 13/088; B25J 9/1638; B25J 9/1641; B25J 9/10; B25J 19/02; B25J 9/1653; B25J 9/06; B25J 9/1682; B25J 13/085; B25J 9/1633; B25J 9/008; Y10S 901/46; Y10S 901/09; Y10S 901/02; G05B 19/404; G05B 2219/39199; G05B 2219/41117; G05B 2219/41122; G05B 2219/39195; G05B 2219/37388; G05B 2219/39109

USPC ........ 700/245, 255, 258, 260, 261; 901/8, 9, 901/14, 19, 46
See application file for complete search history.

(56) References Cited

U.S. PATENT DOCUMENTS 3,119,009 A * 1/1964 Zeller ...................... B23K 9/02
219/124.02
4,158,161 A * 6/1979 Suzuki ................. B23Q 35/122
219/124.34

(Continued)

FOREIGN PATENT DOCUMENTS

JP    4-294986    10/1992
JP    04294986 A * 10/1992

(Continued)

*Primary Examiner* — Khoi Tran
*Assistant Examiner* — Jorge Peche
(74) *Attorney, Agent, or Firm* — Harness, Dickey & Pierce, P.L.C.

(57) ABSTRACT

A robot includes an angular velocity sensor installed to a second horizontal arm and for obtaining the angular velocity of the first horizontal arm with respect to a base, and suppresses the vibration of the first horizontal arm by driving a first electric motor based on the angular velocity of the first horizontal arm. In the robot, an electric wire to be connected to a second electric motor incorporated in the second horizontal arm and electric wire to be connected to the angular velocity sensor are laid around through a wiring duct having end portions coupled respectively to the base and the second horizontal arm, disposed outside the first horizontal arm and outside the second horizontal arm, and having a passage leading to the inside of the base and the inside of the second horizontal arm.

15 Claims, 2 Drawing Sheets

(56) References Cited

U.S. PATENT DOCUMENTS

| | | | | |
|---|---|---|---|---|
| 4,366,423 | A | * | 12/1982 | Inaba ............... G05B 19/41825 318/532 |
| 4,506,847 | A | * | 3/1985 | Norman ................. B64C 31/02 244/1 R |
| 4,620,829 | A | * | 11/1986 | Herve ................. B25J 19/0016 414/720 |
| RE32,414 | E | * | 5/1987 | Hutchins ................. B25J 9/041 318/568.11 |
| 4,706,004 | A | * | 11/1987 | Komatsu ................. B24B 17/10 318/568.14 |
| 5,481,913 | A | * | 1/1996 | Ito ............................ G01D 5/12 73/504.16 |
| 5,605,487 | A | * | 2/1997 | Hileman ................. B24B 37/04 451/11 |
| 5,635,787 | A | * | 6/1997 | Mori ................. G01C 19/5649 310/321 |
| 5,945,599 | A | * | 8/1999 | Fujiyoshi ........... G01C 19/5719 73/504.12 |
| 6,070,463 | A | * | 6/2000 | Moriya ............. G01C 19/5719 73/504.02 |
| 6,134,961 | A | * | 10/2000 | Touge ................ G01C 19/5719 73/504.04 |
| 6,370,983 | B1 | * | 4/2002 | Nakamura ............. G05G 1/015 74/514 |
| 6,837,978 | B1 | * | 1/2005 | Hey ....................... C25D 21/12 204/224 R |
| 7,422,412 | B2 | * | 9/2008 | Akaha ..................... B25J 9/042 414/744.5 |
| 7,752,939 | B2 | * | 7/2010 | Ono ......................... B25J 9/042 74/490.03 |
| 7,765,023 | B2 | * | 7/2010 | Oaki ....................... B25J 9/1692 700/157 |
| 7,826,924 | B2 | * | 11/2010 | Lou ...................... G11B 17/225 369/30.19 |
| 8,145,350 | B2 | * | 3/2012 | Lancaster, III ........ B65G 61/00 414/791.8 |
| 8,393,243 | B2 | * | 3/2013 | Ono ......................... B25J 9/042 414/680 |
| 2001/0033144 | A1 | * | 10/2001 | Doi ......................... B25J 9/042 318/568.11 |
| 2002/0078746 | A1 | * | 6/2002 | Mochida ............. G01C 19/5719 73/504.12 |
| 2003/0131664 | A1 | * | 7/2003 | Mochida ............. G01C 19/5719 73/504.12 |
| 2003/0168346 | A1 | * | 9/2003 | Hey .................. H01L 21/67028 205/157 |
| 2004/0020780 | A1 | * | 2/2004 | Hey .................... H01L 21/2885 205/137 |
| 2004/0083812 | A1 | * | 5/2004 | Ichinose ........... G01C 19/5719 73/504.02 |
| 2005/0246061 | A1 | * | 11/2005 | Oaki ..................... B25J 9/1692 700/245 |
| 2006/0201275 | A1 | * | 9/2006 | Ono ....................... B25J 9/1025 74/490.01 |
| 2007/0110555 | A1 | * | 5/2007 | Ono ....................... B25J 9/1065 414/744.5 |
| 2008/0148848 | A1 | * | 6/2008 | Noguchi ............ G01C 19/5607 73/504.16 |
| 2008/0222883 | A1 | * | 9/2008 | Ono ....................... B23P 21/004 29/787 |
| 2008/0235970 | A1 | * | 10/2008 | Crampton .............. B25J 13/088 33/503 |
| 2010/0050806 | A1 | * | 3/2010 | Ono ......................... B25J 9/044 74/490.02 |
| 2010/0089155 | A1 | * | 4/2010 | Sugihara ................. F16F 15/08 73/497 |
| 2010/0236351 | A1 | * | 9/2010 | Ono ......................... B25J 9/042 74/490.01 |
| 2011/0104742 | A1 | * | 5/2011 | Fox ..................... G01N 35/0095 435/30 |
| 2011/0296914 | A1 | * | 12/2011 | Takahashi .......... G01C 19/5726 73/504.15 |
| 2013/0345877 | A1 | * | 12/2013 | Kose ..................... B25J 9/1633 700/260 |
| 2014/0236355 | A1 | * | 8/2014 | Lukka ................. B25J 19/0091 700/258 |

FOREIGN PATENT DOCUMENTS

| | | | |
|---|---|---|---|
| JP | 2002365095 A | * | 12/2002 |
| JP | 2005-242794 A | | 9/2005 |
| JP | 2010-076024 A | | 4/2010 |
| JP | 2010076024 A | * | 4/2010 |
| JP | 2011-005571 A | | 1/2011 |
| JP | 2011-020188 A | | 2/2011 |
| KR | 20-0277585 | | 5/2002 |
| KR | 2009-0093745 A | | 9/2009 |

\* cited by examiner

HORIZONTAL ARTICULATED ROBOT

CROSS-REFERENCE TO RELATED APPLICATIONS

This is a continuation patent application of U.S. application Ser. No. 13/399,084 filed Feb. 17, 2012, which claims priority to Japanese Patent Application No. 2011-035859 filed Feb. 22, 2011, all of which are expressly incorporated by reference herein in their entireties.

BACKGROUND

1. Technical Field

The present invention relates to a horizontal articulated robot equipped with an angular velocity sensor.

2. Related Art

In the past, there has been known a horizontal articulated robot which suppresses vibration caused in the arm using an angular velocity sensor for detecting the angular velocity of the arm as described in JP-A-2005-242794 (Document 1). In the horizontal articulated robot described in Document 1, a first arm rotatable with respect to the base rotates due to the drive force of a first drive source, and at the same time, the rotational angle of the first drive source is detected by the first angle sensor. Further, the angular velocity of the first arm with respect to the base is detected by an angular velocity sensor mounted on the first arm. Further, the drive amount of the first drive source is controlled based on the angular velocity detected by the angular velocity sensor so that the vibration caused in the first arm can be suppressed.

Incidentally, the vibration caused in the first arm is generally amplified by another arm coupled to the first arm, and then reaches an end effector of the horizontal articulated robot. Therefore, in order to suppress such a vibration of the end effector, it is effective to perform such damping control as described above on the first drive source.

On the other hand, in order to drive the angular velocity sensor described above, it becomes necessary to connect a variety of electric wires such as a wire for supplying the angular velocity sensor with electricity or a wire for transmitting the detection signal of the angular velocity sensor between the angular velocity sensor and the controller. Further, such electric wires are also required for the drive sources besides the angular velocity sensor, and are generally connected to an external controller through a hollow base. Further, if the configuration in which the angular velocity sensor described above is mounted on the first arm is adopted, it results that such an electric wire required to such an angular velocity sensor is also connected between the first arm and the controller through the base.

In this occasion, the track drawn by the first arm with respect to the base generally includes a larger number of tracks with small curvature compared to the tracks drawn by other arms with respect to the base. Therefore, the chances of folding the electric wires drawn from the first arm increase, and further, the curvature in the folded portions also becomes smaller compared to the electric wires drawn from other arms. Therefore, it is required for the horizontal articulated robot performing damping control using the angular velocity sensor to enhance the durability of such an electric wire connected to the angular velocity sensor.

SUMMARY

An advantage of some aspects of the invention is to provide a horizontal articulated robot performing the damping control using an angular velocity sensor, and capable of enhancing the durability of the electric wire connected to the angular velocity sensor.

An aspect of the invention is directed to a horizontal articulated robot including a first arm coupled to a base, a second arm coupled to the base via at least the first arm, a first drive source incorporated in the base and adapted to rotate the first arm in a horizontal direction, a second drive source incorporated in the second arm and adapted to rotate the second arm in a horizontal direction, and an angular velocity sensor installed to the second arm, wherein the first drive source is driven based on the angular velocity obtained by the angular velocity sensor to thereby suppress vibration of the first arm.

According to the horizontal articulated robot of this aspect of the invention, it becomes possible to draw the electric wire to be connected to the angular velocity sensor from the second arm by installing the angular velocity sensor inside the second arm. The track drawn by the second arm with respect to the base generally has a larger curvature compared to the track drawn by the first arm with respect to the base. Therefore, since it becomes possible to decrease the chance of folding the electric wire to be connected to the angular velocity sensor, and to prevent the curvature of the folded portions of the electric wire to be connected to the angular velocity sensor from becoming smaller, it becomes possible to enhance the durability of the electric wire.

The horizontal articulated robot of the above aspect of the invention may be configured to further include a piping member having one end coupled to the base and the other end coupled to the second arm, disposed outside the first arm and outside the second arm, and having a passage leading to an inside of the base and an inside of the second arm, and an electric wire to be connected to the second drive source and an electric wire to be connected to the angular velocity sensor are laid around through the piping member.

According to the horizontal articulated robot of the configuration described above, the electric wire to be connected to the second drive source and the electric wire to be connected to the angular velocity sensor are laid around from the inside of the second arm to the inside of the base through the passage provided to the piping member. According to such a configuration, in order to fold the electric wire to be connected to the angular velocity sensor, it is required to fold the electric wire to be connected to the second drive source and the piping member at the same time. Therefore, since it becomes possible to decrease the chance of folding the electric wire to be connected to the angular velocity sensor, and to prevent the curvature of the folded portions of the electric wire to be connected to the angular velocity sensor from becoming smaller, it becomes possible to further enhance the durability of the electric wire.

The horizontal articulated robot of the above aspect of the invention may be configured to further include a belt disposed inside the second arm, and adapted to transmit a drive force of a third drive source to a displacement member displaced with respect to the second arm, and the angular velocity sensor is disposed above the belt.

Here, if the angular velocity sensor is installed below the belt driven by the third drive source, there is a possibility that a foreign matter generated from the belt drops and then adheres to the angular velocity sensor. In contrast, according to the configuration described above, even if the foreign matter is generated from the belt, the foreign matter can be prevented from adhering to the angular velocity sensor.

The horizontal articulated robot of the above aspect of the invention may be configured such that a connection section between the piping member and the second arm is disposed on an upper side of the second arm.

Here, if the connection section between the second arm and the piping member is disposed in the region of the second arm on the horizontal direction side, the connection section and the peripheral region of the end portion of the piping member, the end portion being located near to the second arm, overlap the rotational path of the second arm, and therefore, might pose an impediment for the second arm to rotate. In contrast, according to the configuration described above, the connection section between the second arm and the piping member, and the peripheral region of the end portion of the piping member, the end portion being located near to the second arm, are disposed at positions never overlapping the rotational path of the second arm. As a result, the smooth rotation of the second arm can be realized.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a horizontal articulated robot according to an embodiment of the invention will be explained with reference to FIGS. 1 and 2.

Figure 1:
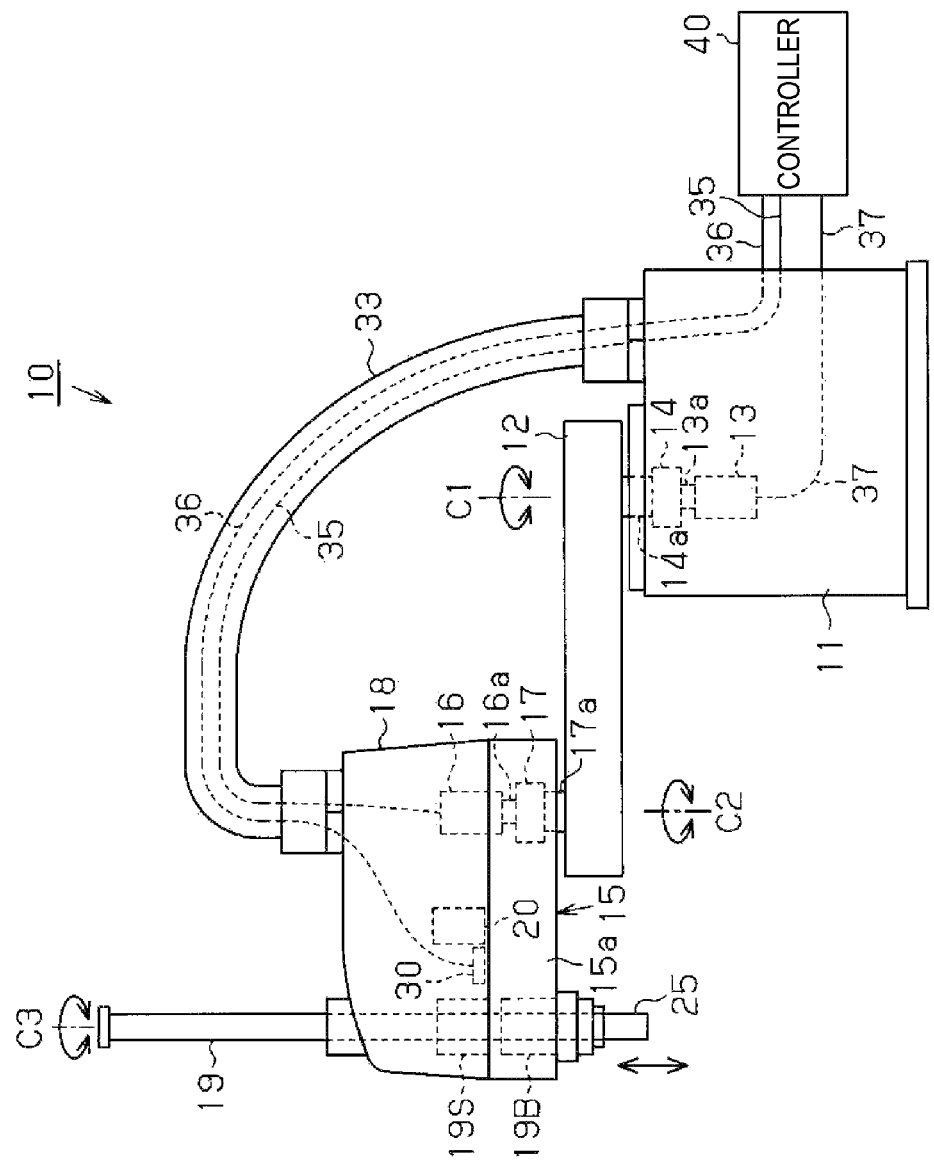
FIG. 1 is a front view showing a front structure of a robot according to an embodiment of the invention.

As shown in FIG. 1, in the robot 10 as the horizontal articulated robot, a base end portion of a first horizontal arm 12 as a first arm rotating around a shaft center C1 along the vertical direction with respect to a base 11 is coupled to an upper end portion of the base 11 to be mounted on, for example, a floor. Inside the base 11, there are disposed a first electric motor 13 as a first drive source for rotating the first horizontal arm 12, and a reduction gear 14 coupled to a rotating shaft 13a of the first electric motor and having an output shaft 14a fixedly-coupled to the first horizontal arm 12. Further, the first horizontal arm 12 rotates in a horizontal direction, namely makes a horizontal turn, with respect to the base 11 due to the drive force of the first electric motor 13 transmitted thereto via the reduction gear 14. The first horizontal arm 12 is made of a metal material such as cast iron, and has high rigidity in, for example, the longitudinal direction and the circling direction.

To the tip portion of the first horizontal arm 12, there is coupled a base end section of an arm main body 15a provided to a second horizontal arm 15 as a second arm rotating around the shaft center C2 along the vertical direction with respect to the first horizontal arm 12. Inside the second horizontal arm 15, there are installed a second electric motor 16 as a second drive source for rotating the second horizontal arm 15, and a reduction gear 17 coupled to the rotating shaft 16a of the second electric motor 16 and having an output shaft 17a fixedly coupled to the first horizontal arm 12. Further, the second horizontal arm 15 rotates in a horizontal direction, namely makes a horizontal turn, around the shaft center C2 with respect to the first horizontal arm 12 due to the drive force of the second electric motor 16 transmitted thereto via the reduction gear 17. The second horizontal arm 15 is made of a metal material such as cast iron, and has high rigidity in, for example, the longitudinal direction and the circling direction.

The second horizontal arm 15 has an arm cover 18 for covering the upper side of the arm main body 15a from the base end portion to the tip portion thereof including the second electric motor 16 and so on. The arm cover 18 is made of, for example, a resin material, and protects the devices such as the second electric motor 16 while preventing the dust generated by the devices from flying to the periphery. The second horizontal arm 15 according to the present embodiment is composed of the arm main body 15a and the arm cover 18.

On the tip portion of the second horizontal arm 15, there is disposed an up/down rotating shaft 19 as a displacement member penetrating the arm main body 15a and the arm cover 18 and displaced with respect to the second horizontal arm 15. The up/down rotating shaft 19 is a columnar shaft member, and is provided with a ball screw groove and a spline groove not shown formed on the circumferential surface thereof. As shown in FIG. 2, the up/down rotating shaft 19 is inserted so that the spline groove thereof is fitted into the center of a spline nut 19S disposed at the tip portion of the second horizontal arm 15, and that the ball screw groove thereof is screwed into the center of a ball screw nut 19B disposed also at the tip portion of the second horizontal arm 15. Thus, the up/down rotating shaft 19 is supported rotatably with respect to the second horizontal arm 15, and movably in a vertical direction.

Figure 2:
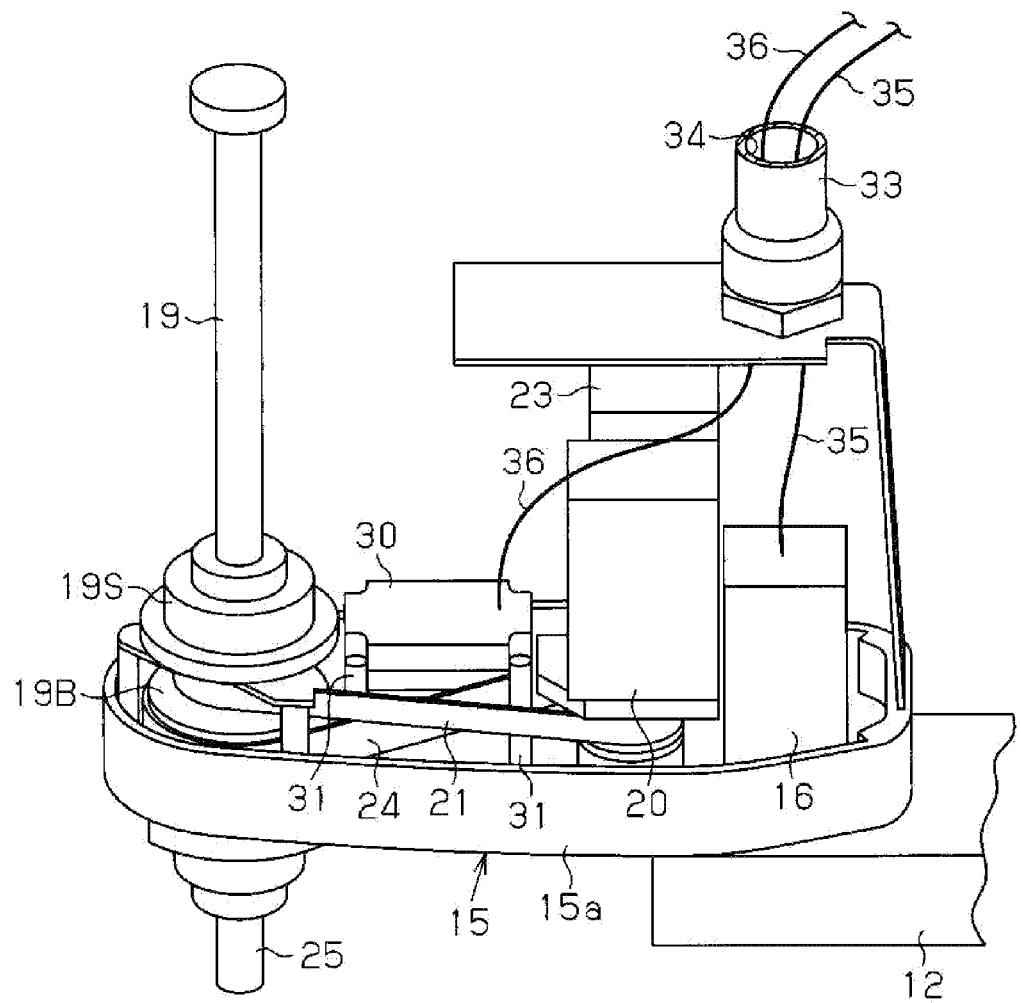
FIG. 2 is a perspective view showing an internal structure of a second horizontal arm, and is a perspective view showing a state with an arm cover detached.

As shown in FIG. 2, inside the second horizontal arm 15, there is installed a rotary motor 20 as a third drive source. The rotary motor 20 has the drive force transmitted to the spline nut 19S via a belt 21. In other words, the up/down rotating shaft 19 is positively and negatively rotated around the own shaft center C3 along a vertical direction in accordance with the spline nut 19S being rotated positively and negatively by the rotary motor 20 described above.

Inside the second horizontal arm 15, there is installed a lifting motor 23 also as the third drive source. The lifting motor 23 has the drive force transmitted to the ball screw nut 19B via a belt 24. In other words, the up/down rotating shaft 19 performs lifting and lowering movements in vertical directions in accordance with the ball screw nut 19B being rotated positively and negatively by the lifting motor 23 described above. Then, a work section 25 as the lower end portion thereof is lifted and lowered in the vertical directions due to the lifting and lowering movements thereof.

The work section 25 of the up/down rotating shaft 19 is arranged to be able to be attached with a tool such as a device for gripping a conveyed object or a device for processing a processed object. Further, the robot is arranged to convey parts or process parts using the respective tools attached to the work section 25.

Further, as shown in FIG. 2, inside the second horizontal arm 15, there is installed an angular velocity sensor 30 for measuring the angular velocity of the second horizontal arm 15. As the angular velocity sensor 30, there is used a vibratory gyroscope using a quartz crystal vibrator in the present embodiment. The angular velocity sensor 30 is supported by a plurality of supporting legs 31 erected inside the second horizontal arm 15 so that the posture thereof can be adjusted.

Here, if a foreign matter is generated from the belts 21, 24 due to drive of at least one of the rotary motor 20 and the lifting motor 23 described above, the foreign matter drops below the belts 21, 24. Therefore, if the angular velocity sensor 30 is installed below the belts 21, 24, it becomes easy for the foreign matter to adhere to the angular velocity sensor 30. In contrast, in the present embodiment, the angular velocity sensor 30 supported by the supporting legs 31 is always disposed above the belts 21, 24 regardless of the rotational angles of the first horizontal arm 12 and the second horizontal arm 15. Therefore, even if at least one of the rotary motor 20 and the lifting motor 23 is driven, the foreign matter dropping from the belts 21, 24 can be prevented from adhering to the angular velocity sensor 30.

Further, as shown in FIG. 2, to the upper portion of the second horizontal arm 15, there is coupled one end of a wiring duct 33 having flexibility as a piping member having the other end coupled to the base 11. The wiring duct 33 has a tubular shape, and the one end thereof is rotatably coupled to the second horizontal arm 15, while the other end is rotatably coupled to the base 11. The wiring duct 33 is provided with a passage 34 leading to the inside of the second horizontal arm 15 and the inside of the base 11. Further, an electric wire 35 connected to the second electric motor 16 installed inside the second horizontal arm 15 and an electric wire 36 connected to the angular velocity sensor 30 are laid around from the inside of the second horizontal arm 15 to the inside of the base 11 through the passage 34 described above.

It should be noted that although not shown in FIGS. 1 and 2, electric wire connected to the rotary motor 20 and electric wire connected to the lifting motor 23 are also laid around to the inside of the base 11 through the passage 34 described above. Further, inside the passage 34, it is preferable that the materials of the constituents of the electric wires and the layout of the electric wires are considered so that the electric wire 36 is not electrically affected by other electric wires.

Incidentally, it is also possible for the connection section between the wiring duct 33 and the second horizontal arm 15 to be disposed at a position shifted to the horizontal direction side of the second horizontal arm 15, namely on the front side or the back side of the drawing sheet in FIG. 1. However, in such a configuration, the connection section and the peripheral region of the end portion of the wiring duct 33, the end portion being located near to the second horizontal arm 15, overlap the rotational path of the second horizontal arm 15, and therefore, might pose an impediment for the second horizontal arm 15 to rotate. In contrast, in the present embodiment, the connection section between the second horizontal arm 15 and the wiring duct 33 are disposed on the upper portion of the second horizontal arm 15. Therefore, the connection section is disposed so that the peripheral region of the end portion of the wiring duct 33, the end portion being located near to the second horizontal arm 15, does not overlap the rotational path of the second horizontal arm 15. Thus, the smooth rotation of the second horizontal arm 15 can be realized.

Further, the angular velocity sensor 30 is a sensor for detecting the angular velocity of the second horizontal arm 15, and is therefore only required to be installed in the second horizontal arm 15. However, if the angular sensor is installed outside the second horizontal arm 15 instead of the inside of the second horizontal arm 15, a separate configuration for laying the electric wire connected to the angular velocity sensor 30 around to the inside of the second horizontal arm 15 becomes necessary in order to lay the electric wires around through the passage 34 of the wiring duct 33. Since the configuration for laying the electric wire 36 around to the inside of the second horizontal arm 15 becomes unnecessary by installing the angular velocity sensor 30 inside the second horizontal arm 15 as in the case of the present embodiment, simplification of the configuration of the second horizontal arm 15, and consequently of the configuration of the robot 10, can be achieved.

Further, the electric wires laid around to the inside of the base 11 are bundled in the inside of the base 11 to thereby be laid around to a controller 40, which is installed in the outside of the base 11 to perform overall control of the robot 10, together with an electric wire 37 connected to the first electric motor 13 described above.

The controller 40 controls the drive amount of the first electric motor 13 based on the signal input from the angular velocity sensor 30 so that the vibration of the second horizontal arm 15 is suppressed. For example, the controller 40 obtains the rotational angle of the first electric motor 13 from the encoder installed in the first electric motor 13, and further obtains the rotational angle of the second electric motor 16 from the encoder installed in the second electric motor 16. Further, the controller 40 estimates the angular velocity of the first horizontal arm 12 based on the angular velocity of the second horizontal arm 15, the rotational angle of the first electric motor 13, the rotational angle of the second electric motor 16, and so on to thereby control the drive amount of the first electric motor 13 so that the vibration of the first horizontal arm 12 is suppressed.

As explained hereinabove, according to the robot 10 related to the present embodiment, the advantages recited as follows can be obtained.

1. According to the robot 10 of the embodiment described above, since the angular velocity sensor 30 for controlling the drive amount of the first electric motor 13 is disposed in the second horizontal arm 15, the electric wire 36 to be connected to the angular velocity sensor 30 is drawn from the second horizontal arm 15. Here, the track drawn by the second horizontal arm 15 to the base 11 has larger curvature with respect to the base 11 compared to the track drawn by the first horizontal arm 12 to the base 11. Therefore, since it becomes possible to decrease the chance of folding the electric wire 36 to be connected to the angular velocity sensor 30, and to prevent the curvature of the folded portions of the electric wire 36 to be connected to the angular velocity sensor 30 from becoming smaller, it becomes possible to enhance the durability of the electric wire 36.

2. According to the robot 10 of the embodiment described above, the electric wire 35 to be connected to the second electric motor 16 and the electric wire 36 to be connected to the angular velocity sensor 30 are laid around from the inside of the second horizontal arm 15 to the inside of the base 11 through the passage 34 provided to the wiring duct 33. The electric wire 36 to be connected to the angular velocity sensor 30 can be laid around from the second horizontal arm 15 to the base 11 using the wiring duct 33 coupled to both of the second horizontal arm 15 and the base 11 as realized in such a configuration. Since it is required to fold the wiring duct 33 in addition to the electric wire 36 in order to fold the electric wire 36, it is possible to reduce the chances of folding the electric wire 36, and to prevent the curvature of the folded portions from becoming smaller. As a result, it becomes possible to further enhance the durability of the electric wire.

Further, since the electric wires 35, 36 to be connected respectively to the second electric motor 16 and the angular velocity sensor 30 are laid around the inside of the base 11, there are laid around inside the base 11 not only the electric wire 37 to be connected to the first electric motor 13 but also the electric wires 35, 36 to be connected respectively to the second electric motor 16 and the angular velocity sensor 30. Therefore, it is also possible to lay these electric wires 35 through 37 around to the outside of the base 11 in a lump.

3. In the embodiment described above, the angular velocity sensor 30 is disposed inside the second horizontal arm 15. Thus, there is no need to provide the configuration for laying the electric wire 36 to be connected to the angular velocity sensor 30 around to the second horizontal arm 15, which is required in the case of installing the angular velocity sensor 30 on the lower surface of the arm main body 15a. As a result, simplification of the configuration of the second horizontal arm 15, and consequently the configuration of the robot 10, can be achieved.

4. According to the robot 10 of the embodiment described above, since the angular velocity sensor 30 is disposed above the belts 21, 24, the foreign matter dropping from the belts 21, 24 can be prevented from adhering to the angular velocity sensor 30.

5. According to the robot 10 of the embodiment described above, since the connection section between the second horizontal arm 15 and the wiring duct 33 is disposed on the upper side of the second horizontal arm 15, the peripheral region of the end portion of the wiring duct 33, the end portion being near to the second horizontal arm 15, is disposed at a position never overlapping the rotational path of the second horizontal arm 15. As a result, the smooth rotation of the second horizontal arm 15 can be realized.

It should be noted that the embodiment described above can be put into practice with the following modifications if necessary.

In the embodiment described above, the connection section between the second horizontal arm 15 and the wiring duct 33 is disposed on the upper side of the second horizontal arm 15, namely at the position not overlapping the rotational path of the second horizontal arm 15. It is also possible to modify this configuration to thereby dispose the connection section so as to overlap the rotational path of the second horizontal arm 15 from the viewpoint of laying the electric wires 35, 36 to be connected to the second electric motor 16 and the angular velocity sensor 30 around to the inside of the base 11 through the passage 34. Even with such a configuration, advantages equivalent to the advantages recited as 1 through 4 above can be obtained.

In the embodiment described above, the angular velocity sensor 30 is disposed above the belts 21, 24 for transmitting the drive forces of the rotary motor 20 and the lifting motor 23. It is also possible to modify this configuration to thereby dispose the angular velocity sensor 30 below the belts 21, 24. Even with such a configuration, advantages equivalent to the advantages recited as 1 through 3 above can be obtained.

In the robot 10 of the embodiment described above, there is disposed the wiring duct 33 provided with the passage 34 through which the electric wire 36 is laid around. Besides this configuration, it is also possible for the robot 10 to have a configuration in which the wiring duct 33 is reluctantly omitted to thereby expose the electric wire extending from the angular velocity sensor 30 to the base 11. Even with such a configuration, an advantage equivalent to the advantage recited as 1 above can be obtained providing that a variety of electric wires extending from the arm is generally drawn to the outside through the base, and the angular velocity sensor for suppressing the vibration of the first arm is installed to the second arm.

It is also possible for the robot 10 of the embodiment described above to have a configuration further including another arm intervening between the first horizontal arm 12 and the second horizontal arm 15.

The angular velocity sensor 30 of the embodiment described above is disposed inside the second horizontal arm 15. However, since the angular velocity sensor is only required to be installed to the second horizontal arm 15, the installation position is not limited to the inside of the second horizontal arm 15. Even with such a configuration, the advantages recited as 1 and 2 above can be obtained.

The robot 10 according to the embodiment described above has the wiring duct 33 having a tubular shape provided with the passage 34 as a piping member. Besides this configuration, any piping member capable of housing the electric wire and preventing the electric wire from getting entangled during the operation of the robot 10 can be adopted, and the shape thereof is not limited to the tubular shape. Further, the piping member is only required to have flexibility, and the material thereof is not particularly limited.

As the angular velocity sensor 30 of the embodiment described above, a vibratory gyroscope using a quartz crystal vibrator is adopted. Besides this configuration, the angular velocity sensor is only required to be able to measure the angular velocity of the second horizontal arm 15 with respect to the base 11, and a rotary gyroscope, a gas gyroscope, a ring-laser gyroscope, and so on can also be adopted.

The suppression of the vibration of the first horizontal arm 12 is only required to be achieved by controlling the drive amount of the first electric motor 13 using the detection result of the angular velocity sensor 30, and it is also possible to adopt the process of, for example, detecting the vibration of the second horizontal arm 15 from the detection result of the angular velocity sensor 30 and the rotational angle of the second electric motor 16 to thereby suppress the vibration under the estimation that the vibration thus detected is the vibration of the first horizontal arm 12. Further, in the case in which the first horizontal arm 12 and the second horizontal arm 15 are fixed on the same axis line, and the first horizontal arm 12 rotates alone, it is also possible to adopt the process of, for example, estimating the vibration of the first horizontal arm 12 based on the detection result of the angular velocity sensor 30 and the rotational angle of the first electric motor 13, and then suppressing the vibration.

What is claimed is:

1. A robot comprising:
   a first arm connected to a base;
   a second arm that comprises a body and a cover, and the body is coupled to the base via at least the first arm;
   an angular velocity sensor disposed inside the cover, and installed at the body;
   a belt disposed inside the second arm; and
   a plurality of supporting legs extending parallel to each other and located within the second arm, wherein the angular velocity sensor is coupled to the body of the base by way of the supporting legs and the angular velocity sensor is positioned above the belt by way of the supporting legs.

2. The robot according to claim 1, comprising:
   a first drive source incorporated in the base and adapted to rotate the first arm; and
   a second drive source incorporated in the second arm and adapted to rotate the second arm.

3. The robot according to claim 2, wherein:
   the belt is adapted to transmit a drive force of a third drive source to a displacement member displaced with respect to the second arm.

4. The robot according to claim 3 wherein the body is made of a metal material, and the cover is made of a resin material.

5. The robot according to claim 2 wherein the body is made of a metal material, and the cover is made of a resin material.

6. The robot according to claim 1, comprising:
a piping member having one end coupled to the base and the other end coupled to the second arm; and
wherein an electric wire connected to the angular velocity sensor is passed into the piping member.

7. The robot according to claim 6,
wherein a connection section between the piping member and the second arm is disposed on an upper side of the second arm.

8. The robot according to claim 7 wherein the body is made of a metal material, and the cover is made of a resin material.

9. The robot according to claim 6 wherein the body is made of a metal material, and the cover is made of a resin material.

10. The robot according to claim 1 wherein the body is made of a metal material, and the cover is made of a resin material.

11. The robot according claim 1 wherein the angular velocity sensor is a gyroscope.

12. A horizontal articulated robot comprising:
a first arm coupled to a base;
a second arm that comprises a body and a cover, and the body is coupled to the base via at least the first arm;
an angular velocity sensor positioned at the second arm under the cover, wherein a first surface of the angular velocity sensor is coupled to a first surface of the body of the second arm;
a connection section positioned along an outer surface of the cover of the second arm, wherein the angular velocity sensor is positioned between the first surface of the body and the connection section;
a piping member having one end coupled to the base and the other end coupled to the second arm via the connection section;
a wire extending through the piping member, the connection section, and the second arm, wherein the wire is coupled to the angular velocity sensor along a second surface of the angular velocity sensor that is different from the first surface of the angular velocity sensor;
a belt disposed inside the second arm; and
a plurality of supporting legs extending parallel to each other and located within the second arm, wherein the angular velocity sensor is coupled to the body of the base by way of the supporting legs and the angular velocity sensor is positioned above the belt by way of the supporting legs.

13. The robot of claim 12 wherein the first surface of the angular velocity sensor faces and is parallel with the first surface of the body.

14. The robot of claim 12 wherein the wire extends between the connection section of the second arm and the angular velocity sensor and is away from the belt.

15. The robot of claim 12 wherein the first surface of the angular velocity sensor extends between the first surface of the body and the second surface of the angular velocity sensor.

* * * * *